Patented Sept. 24, 1935

2,015,408

UNITED STATES PATENT OFFICE 2,015,408

OLEATE OF BENZYL CARBINAMINES

Fred P. Nabenhauer, Philadelphia, Pa., assignor to Smith, Kline & French Laboratories, Philadelphia, Pa., a corporation of Pennsylvania No Drawing. Application January 23, 1931,
Serial No. 510,768

3 Claims. (Cl. 260—112)

My invention relates to oleates of benzyl carbinamines which are used as medicinal remedies, and more particularly are used in connection with the treatment of common colds, rose colds, hay fever, sinusitis, nasal catarrh, and in conditions causing congestion of the nasal passages.

In accordance with my invention, I provide a novel remedy for use in the treatment of affections, more particularly of the upper respiratory tract, as indicated, which will be effective to shrink the mucosa and to reduce the size of turbinates, which, under the conditions indicated, become enlarged and congest the nasal passages.

The novel remedy in accordance with my invention may be readily administered, for example, by the use of a dropper, by spraying, or by direct application, as with a cotton pledget and will be found to be especially advantageous in that it will effect a shrinkage of the mucosa of long duration, say of from one-half hour to three hours and since it is non-irritating may be administered without discomfort, as stinging, especially in cases where the membrane is inflamed and sensitive.

The novel remedy in accordance with my invention lends itself to administration in solution in, for example, an oil, which without reducing the efficacy of the remedy will act to soothe and relieve irritation of inflamed and sensitive membrane.

The medicinal remedy in accordance with my invention comprises essentially the oleate of a benzyl carbinamine having the structure:

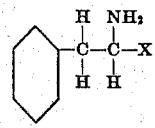

in which X is a hydrogen or a monovalent organic radical as an alkyl, aryl, or alphyl group.

More particularly, the medicinal remedy in accordance with my invention involves a benzyl carbinammonium oleate in solution in an oil, such, for example, as a mineral oil, of suitable viscocity, as for example, paraffine oil, or the oil may be a vegetable oil, as cottonseed oil. The medicinal remedy where the benzyl carbinammonium oleate is in solution in an oil may comprise merely the carbinammonium oleate and an oil or, if desired, other ingredients, as for example, a flavor such as essential oil or natural or synthetic perfume may be included.

The medicinal remedy in accordance with my invention may comprise any of the benzyl carbinammonium oleates as indicated by the above structural formula, which may be hydroxylated or non-hydroxylated.

More specifically, the remedy may comprise, for example, benzyl methyl carbinammonium oleate, or, for example, an oleate formed by the reaction of oleic acid on the hydroxylated benzyl carbinamine, ephedrine, preferentially in solution in a suitable mineral oil.

The medicinal remedy in accordance with my invention may be readily prepared by reacting oleic acid with a benzyl carbinamine, desirably an excess of oleic acid being added to the benzyl carbinamine. For example, about 5% excess of oleic acid over the theoretical, 2.1 parts oleic acid to one part benzyl carbinamine, may be added. The reaction between the oleic acid and the benzyl carbinamine for production of the oleate will take place under normal conditions of temperature and pressure upon addition of the acid to the benzyl carbinamine. The production of the benzyl carbinammonium oleate may be effected by reacting a benzyl carbinamine and oleic acid, or where the oleate is to be dissolved in an oil the oleate may be produced in the oil by the addition of a benzyl carbinamine and of oleic acid to the oil.

Where the medicinal remedy in accordance with my invention comprises a benzyl carbinammonium oleate dissolved in oil, the solution may desidably contain from about .5% to about 10% of oleate and, as has been indicated above, the solution may contain other ingredients such, for example, as a flavor, etc.

What I claim and desire to protect by Letters Patent is:

1. A benzyl alkyl carbinammonium oleate having the following structural formula:

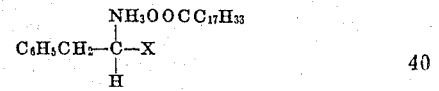

in which X is an alkyl, an aryl or an alphyl group or hydrogen.

2. A benzyl alkyl carbinammonium oleate of the following formula:

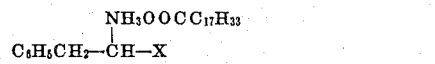

in which X in an alkyl group.

3. A benzyl methyl carbinammonium oleate of the following structural formula:

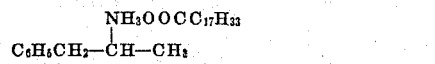

FRED P. NABENHAUER.